United States Patent Office 3,100,202
Patented Aug. 6, 1963

3,100,202
PROCESS FOR PREPARING AN IRON HYDROXIDE POLYISOMALTOSE COMPLEX AND THE RESULTING PRODUCT
Arthur Müller, St. Georgenstr. 100B, and Theodor Bersin, Ludwigstr. 19, both of Sankt Gallen, Switzerland
No Drawing. Filed June 17, 1960, Ser. No. 36,734
10 Claims. (Cl. 260—209)

The present invention relates to an improved therapeutic composition containing iron and more particularly to the process of manufacture of a colloidal iron-polyisomaltose complex which is parenterally injectible.

It is well known that hemoglobin, cytochrome, catalase and other prophyrine protein complexes containing iron cannot be synthesized by the body tissue unless iron is available from an outside source. Blood cells and other structures containing iron are constantly destroyed in the normal processes of cell metabolism thus liberating inorganic iron which is in part excreted and has to be replaced. While most individuals maintain the requisite iron levels through normal food intake, many individuals suffer from anemia brought about by iron deficiency, thus requiring supplemental iron above that in the food intake.

It is recognized that ferrous sulfate, carbonate, citrate, soluble double salts and even metallic iron powder, to mention a few, have been and are now being used for oral iron therapy. It has been found, however, that such iron containing compounds, orally given, are incompletely absorbed and the metabolism of such is slow in many cases. Further, in some cases iron compounds when orally taken results in severe alimentary disturbances.

To overcome the obvious defects of the oral administration iron containing compounds, saccharated iron oxide preparations have been used for intravenous injection with limited success, in all probability for the reason that successive batches vary in potency. Additionally, these preparations are not suitable for intramuscular or subcutaneous injection in that the high osmotic pressure and the possible alkalinity of the intravenous injectible preparations usually result in considerable pain and inflammation at the site of the injection. Further, such preparations are not appreciably absorbed into the body when administered in this manner.

A known treatment for iron deficiency anemia is a colloidal iron preparation prepared from the degradation products of dextran complexed with a solution or suspension of one or several trivalent iron compounds. Dextran or gum dextran, as it is sometimes called, is a polysaccharide having the empirical formula $(C_6H_{10}O_5)_n$ and is obtained from the fermentation of a sucrose containing material, such as sugar cane, sugar beet, sorghum, molasses and the like. It is preferably fermented under carefully controlled conditions by means of bacterium such as *Leuconostoc mesenteroides*, syn. *Betacoccus arabinosaceous* (Cienkowski van Tieghem), Bergey's Manual of Determinative Bacteriology, fifth edition. The product of such a fermentation is called dextran and is a viscous mucilaginous substance with high molecular weight often reaching 200,000. Because of its high molecular weight, dextran is not directly suitable for injection, but is generally first hydrolyzed with a dilute mineral acid, filtered and fractionated to recover simple polymeric forms of molecular weight of 30,000 to 80,000 or lower.

The known colloidal iron dextron complexes have been produced by numerous methods, for example by reacting dextran degradation products in solution or suspension with ferric hydroxide or other trivalent iron salts and an excess of alkali. Other methods employed have been to react dextran with divalent iron salt to form ferrous hydroxide dextran complex which are subsequently converted by oxidation into the corresponding ferric hydroxide complex. Complexes prepared by known methods comprise up to about 27% by weight of Fe; however, more generally in the range of 16% to 25% and are characterized by having a ratio of one mol of Fe to each anhydroglucose unit of the dextran. Heretofore attempts to increase the iron to anhydroglucose ratio have been unsuccessful.

In accordance with the process of this invention, we produce a parenterally injectible iron hydroxide polyisomaltose complex which contains 32% Fe by weight and has a ratio of 2 mols Fe to each anhydroglucose unit of the polyisomaltose.

The iron hydroxide polyisomaltose complex prepared in accordance with our process provides a therapeutic preparation which is more heterogeneous in particle size, surprisingly lower toxicity, better pharmacological properties and of higher therapeutic efficacy than the iron-dextran complexes hitherto known. In addition to the foregoing advantages, we have discovered that both trivalent and divalent iron salts may be utilized successfully in the process of this invention.

It has been theorized that the therapeutic advantages derived from a ferric hydroxide polyisomaltose complex prepared in accordance with our process is due to the ratio of two mols of iron to each anhydroglucose unit of the polyisomaltose; however, while this theory has been advanced as a possible explanation of the advantages derived from our invention, the invention is not limited to any particular theory or theories.

The "iron polyisomaltose" of our invention is a complex compound consisting of iron hydroxide and polyisomaltose. Polyisomaltose is a polyhexosan; in other words, a polydisaccharide made up of glucose units $(C_6H_{10}O_5)_n$. For analogy to the nomenclature in Chemical Abstracts (e.g., polyhexosan→glucosan→dextran→polyisomaltose), the compound could be designated "polyisomaltose ferric hydroxide." While "polyisomaltose" is a term used loosely for "dextran" as mentioned hereinbefore, the latter is a compound of very high molecular weight, whereas polyisomaltose is a degradation product of dextran consisting of polymerized glucose residues joined predominantly by 1,6 linkages.

The molecular range of the partially depolymerized dextran used as a starting material is selected from the standpoint of its intrinsic viscosity. It is known that the term intrinsic viscosity refers to the limiting value of specific viscosity divided by concentration at infinite dilution measured as follows: The "flow time" of solutions of different concentrations is determined by a viscometer. The flow time of the solution divided by the flow time for water at the same temperature gives the relative viscosity of the dextran solution at a given concentration. The specific viscosity of the dextran solution at a given concentration is obtained by subtracting 1.0 from the value for relative viscosity. The specific viscosity of each solution is divided by the concentration of that solution and the results are plotted against the percentage concentration of the solution from which it is obtained. By extrapolating the graph obtained to zero concentration, the limiting value of the specific viscosity divided by the concentration is obtained. This limiting value is the intrinsic viscosity of the material in solution.

In accordance with the process of this invention, a solution or suspension of dextran containing predominantly 1,6 glucose linkage is mixed with an acidic solution of an iron compound, in respective amounts of about 48 to 141 weight parts of said iron compound per 100 parts of dextran. While it is advantageous to use as a starting material a dextran having a maximum intrinsic viscosity at 25° C. of 0.1, dextran of higher intrinsic viscosity may be utilized; however, where such is used, the acidic solution of the iron compound and dextran is heated until the intrinsic viscosity of the dextran is a maximum of 0.1 and without isolating the depolymerization products the process is continued. An alkali carbonate solution is added to the polyisomaltose-iron solution until precipitates formed dissolve with vigorous stirring. The initial solution is ochre colored which upon completion of the reaction turns brown-red in color. All of the carbon dioxide formed during this reaction will have evolved when the reaction is complete. An alkali hydroxide is then added to the solution until the formed suspension is well on the alkaline side and then heated until all suspended iron hydroxide particles are in solution.

The alkaline ferric hydroxide polyisomaltose complex containing solution may be neutralized prior to being isolated and purified. As neutralization reagents, solid, liquid or gaseous acids may be used, for example cation exchange resins in the H-form, fuming sulfuric acid and hydrochloric acid. In order to free the solution of electrolytes an alkaline anion exchange resin may be added in addition to the cation exchange resin, or the solution may be dialyzed against water.

Where a divalent iron salt is used initially, the alkaline ferrous hydroxide polyisomaltose solution is dialyzed against well aired, flowing and demineralized water which dialysis converts the divalent iron hydroxide to the trivalent form while effecting neutralization and removal of electrolytes.

As iron salts, there may be employed any water soluble salt such as ferric or ferrous chloride, nitrate, acetate, sulfate and the like. Suitable alkalies include alkali metal hydroxides, ammonium hydroxide and the like. Suitable carbonates include sodium and potassium carbonates and bicarbonates. It is clear that any water soluble alkali and carbonate may be used with success in the process of this invention, the alkali and carbonate chosen being dictated only by the economics of the process.

Excellent water soluble preparations of our compound are obtained by any of the well-known processes for example by evaporation of the neutral solutions under reduced pressure or by precipitation with a water soluble organic solvent for example methyl or ethyl alcohol.

The following examples set out in detail are illustrative of the process of this invention:

*Example 1*

A mixture of 50 g. polyisomaltose having an intrinsic viscosity of 0.30 at 25° C., 412 ml. water, 80 ml. of an aqueous solution containing 30% by weight $FeCl_3 \cdot 6H_2O$ and 8.32 ml. of 37% HCl was boiled under reflux until the intrinsic viscosity at 25° C. decreased to 0.06. The solution was cooled and $Na_2CO_3$ was added to the solution until the pH reached about 2.4. After all of the carbon dioxide formed had evolved, 45 ml. of 10 N NaOH was added. The mixture was maintained at a temperature of 70° C. for 30 minutes after which the solution was cooled and the pH adjusted to 6.2 with 90 ml. of a strongly acidic cation exchange resin and 20 ml. of an alkaline exchange resin. The adjusted solution was filtered from the exchange resins and mixed with 96% ethyl alcohol in a ratio of one part by volume solution to 2.5 parts by volume of alcohol. The precipitated ferric hydroxide polyisomaltose complex was separated from the supernatant solution and dried under vacuum. The analytically pure complex contained 32% iron. The complex was processed into an isotonic aqueous solution containing 5% iron.

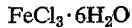

*Example 2*

35 g. of dextran having an intrinsic viscosity at 25° C. of 0.05 was dissolved in 75 ml. of water with heat. The solution was cooled and to the cooled solution, 50 g. $FeSO_4 \cdot 7H_2O$ was added and dissolved. To this solution an additional 75 ml. of water was added. $Na_2CO_3$ was added to the solution until a pH of 2.3 was reached. After all of the carbon dioxide formed had evolved, 11 ml. of 10 N NaOH was added and the reaction was allowed to proceed for 30 minutes at a temperature of 65° C. The solution was cooled, centrifuged and dialyzed against well-aired, flowing and demineralized water until there was neutral reaction and no trace of sulfate ions. The ferric hydroxide polyisomaltose solution was evaporated under reduced pressure at a temperature of 40° C. until it had an iron content of 5%. The solution was made isotonic by the addition of NaCl. The analytically pure complex contained 32% iron.

The ferric hydroxide polyisomaltose compound prepared in each of the foregoing examples was analyzed by fractionally precipitating the complex from aqueous solution with methanol to a constant iron content. The results showed in all fractions a ratio of 2 mols of iron for each anhydroglucose unit of the polyisomaltose.

The invention has been described in the foregoing but it will be understood that many variations may be introduced in details of procedure and conditions without departure from the scope of the invention and we intend to be limited only by the following claims.

We claim:

1. A process of preparing an iron hydroxide polyisomaltose complex containing about 32% iron by weight comprising heating an acidic aqueous solution of a water-soluble dextran, having an intrinsic viscosity greater than 0.1 at 25° C. and a water-soluble iron compound in respective amounts of about 48 to about 141 weight parts of said iron compound per 100 weight parts of dextran until the intrinsic viscosity of said solution is not more than 0.1 at 25° C., reacting the resulting solution with an alkali carbonate at an acid pH whereupon carbon dioxide is evolved, alkalinizing the resulting solution with an alkali metal hydroxide after completion of the carbon dioxide evolution, and thereafter heating the resulting solution to form said complex.

2. A process of preparing an iron hydroxide polyisomaltose complex containing about 32% iron by weight comprising reacting an acidic aqueous solution of a water soluble dextran having an intrinsic viscosity of not more than 0.1 at 25° C. and a water soluble iron compound in respective amounts of about 48 to about 141 weight parts of said iron compound per 100 weight parts of dextran with an alkali carbonate at an acid pH whereupon carbon dioxide is evolved, alkalinizing the resulting solution with an alkali metal hydroxide after said carbon dioxide has evolved, and thereafter heating the resulting solution to form said complex.

3. The process as claimed in claim 2 wherein said iron compound contains trivalent iron.

4. The process as claimed in claim 2 wherein said iron compound contains divalent iron.

5. The process as claimed in claim 2 wherein said alkali carbonate is sodium carbonate.

6. The process as claimed in claim 2 wherein said alkali metal hydroxide is sodium hydroxide.

7. The process as claimed in claim 2 wherein the pH of said solution after reaction with alkali carbonate is about 2.3 and the pH of said solution after alkalinization with alkali metal hydroxide is not less than 11.

8. An iron hydroxide polyisomaltose complex containing about 32% iron by weight.

9. A ferric hydroxide polyisomaltose complex containing about 32% iron by weight.

10. A ferrous hydroxide polyisomaltose complex containing about 32% iron by weight.

References Cited in the file of this patent
UNITED STATES PATENTS

| | | |
|---|---|---|
| 2,820,740 | London et al. | Jan. 21, 1958 |
| 2,885,393 | Herb | May 5, 1959 |
| 3,022,221 | Floramo | Feb. 20, 1962 |

OTHER REFERENCES

The New England Journal of Medicine, vol. 260, Jan. 22, 1959, page 180.

Drug Trade News, vol. 35, No. 10, May 16, 1960, pages 1 and 72.